United States Patent
Ma et al.

(10) Patent No.: US 9,639,808 B2
(45) Date of Patent: May 2, 2017

(54) NON-TRANSITORY COMPUTER READABLE MEDIUM, INFORMATION PROCESSING APPARATUS, AND ATTRIBUTE ESTIMATION METHOD

(71) Applicant: FUJI XEROX CO., LTD., Tokyo (JP)

(72) Inventors: Xiaojun Ma, Kanagawa (JP); Yukihiro Tsuboshita, Kanagawa (JP); Noriji Kato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 63 days.

(21) Appl. No.: 14/519,694

(22) Filed: Oct. 21, 2014

(65) Prior Publication Data

US 2015/0363671 A1 Dec. 17, 2015

(30) Foreign Application Priority Data

Jun. 11, 2014 (JP) ................................ 2014-120377

(51) Int. Cl.
*G06K 9/62* (2006.01)
*G06N 99/00* (2010.01)
*G06K 9/00* (2006.01)

(52) U.S. Cl.
CPC ....... *G06N 99/005* (2013.01); *G06K 9/00684* (2013.01); *G06K 2009/00322* (2013.01)

(58) Field of Classification Search
None
See application file for complete search history.

(56) References Cited

U.S. PATENT DOCUMENTS

| | | | | |
|---|---|---|---|---|
| 7,672,969 | B1* | 3/2010 | Gawdiak | G06Q 10/00 707/999.102 |
| 7,991,230 | B2* | 8/2011 | Yang | G06K 9/469 382/118 |
| 9,317,815 | B2* | 4/2016 | Landers | G06N 5/048 |
| 2005/0129331 | A1* | 6/2005 | Kakiuchi | G06T 7/408 382/275 |
| 2010/0260424 | A1* | 10/2010 | Okubo | G06K 9/00248 382/203 |
| 2013/0080161 | A1* | 3/2013 | Iwata | G10L 15/24 704/231 |
| 2014/0248802 | A1* | 9/2014 | Hieda | H04L 12/2818 439/620.01 |
| 2015/0138334 | A1* | 5/2015 | Usuba | G02B 21/365 348/79 |
| 2015/0363671 | A1* | 12/2015 | Ma | G06N 99/005 382/155 |
| 2016/0162779 | A1* | 6/2016 | Marcus | G06N 99/005 706/12 |

FOREIGN PATENT DOCUMENTS

| | | |
|---|---|---|
| JP | 2009098964 A | 5/2009 |
| JP | 2013218579 A | 10/2013 |

* cited by examiner

*Primary Examiner* — Iman K Kholdebarin
(74) *Attorney, Agent, or Firm* — Oliff PLC

(57) ABSTRACT

There is provided a non-transitory computer readable medium storing a program causing a computer to execute a process for attribute estimation. The process includes: extracting, for each user, feature quantities of plural pieces of image information that are associated with attributes of the user; integrating the extracted feature quantities for each user; and performing learning, input of the learning being an integrated feature quantity that has been obtained as a result of integration for each user, output of the learning being one attribute, and generating a learning model.

9 Claims, 11 Drawing Sheets

FIG. 7A

SEX  ↗ 217a

| MALE |
|---|
| FEMALE |
| UNKNOWN |

AGE  ↗ 217b

| -10 |
|---|
| 10-20 |
| 20-30 |
| 30-40 |
| 40- |
| UNKNOWN |

IMAGE CONTENTS

| PORTRAIT |
|---|
| CELEBRITY |
| FOOD |
| ANIMAL |
| SUNDRIES |
| ILLUSTRATION |
| SCREEN SHOT |
| NOTE |
| NATURE |
| OTHERS |

FIG. 8

| IMAGE CONTENTS \ SEX | MALE | FEMALE | UNKNOWN |
|---|---|---|---|
| PORTRAIT | MALE-PORTRAIT | FEMALE-PORTRAIT | UNKNOWN-PORTRAIT |
| CELEBRITY | MALE-CELEBRITY | FEMALE-CELEBRITY | UNKNOWN-CELEBRITY |
| FOOD | MALE-FOOD | FEMALE-FOOD | UNKNOWN-FOOD |
| ANIMAL | MALE-ANIMAL | FEMALE-ANIMAL | UNKNOWN-ANIMAL |
| SUNDRIES | MALE-SUNDRIES | FEMALE-SUNDRIES | UNKNOWN-SUNDRIES |
| ILLUSTRATION | MALE-ILLUSTRATION | FEMALE-ILLUSTRATION | UNKNOWN-ILLUSTRATION |
| SCREEN SHOT | MALE-SCREEN SHOT | FEMALE-SCREEN SHOT | UNKNOWN-SCREEN SHOT |
| NOTE | MALE-NOTE | FEMALE-NOTE | UNKNOWN-NOTE |
| NATURE | MALE-NATURE | FEMALE-NATURE | UNKNOWN-NATURE |
| OTHERS | MALE-OTHERS | FEMALE-OTHERS | UNKNOWN-OTHERS |

| IMAGE ID | IMAGE LABEL | SCORE |
|---|---|---|
| 001 | FEMALE-PORTRAIT | 0.35 |
| 001 | FEMALE-FOOD | 0.21 |
| ⋮ | ⋮ | ⋮ |
| 001 | FEMALE-NATURE | 0.01 |
| 002 | MALE-SUNDRIES | 0.13 |
| 002 | MALE-OTHERS | 0.05 |
| ⋮ | ⋮ | ⋮ |
| 003 | UNKNOWN-NATURE | 0.23 |
| ⋮ | ⋮ | ⋮ |

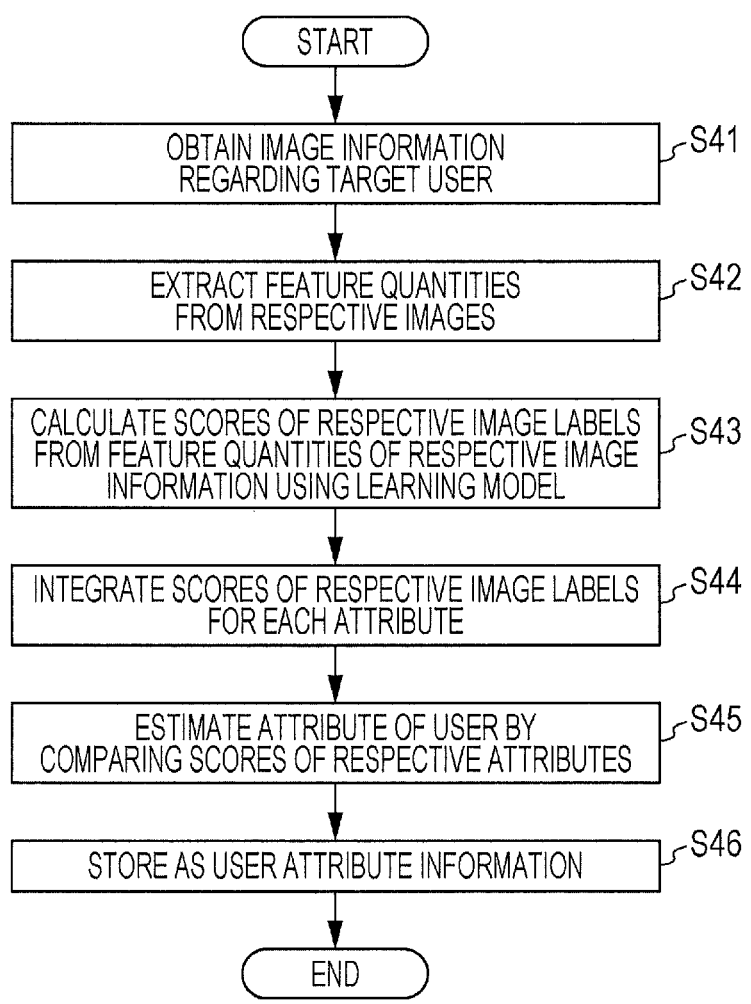

NON-TRANSITORY COMPUTER READABLE MEDIUM, INFORMATION PROCESSING APPARATUS, AND ATTRIBUTE ESTIMATION METHOD

CROSS-REFERENCE TO RELATED APPLICATIONS

This application is based on and claims priority under 35 USC 119 from Japanese Patent Application No. 2014-120377 filed Jun. 11, 2014.

BACKGROUND

Technical Field

The present invention relates to a non-transitory computer readable medium, an information processing apparatus, and an attribute estimation method.

SUMMARY

According to an aspect of the invention, there is provided a non-transitory computer readable medium storing a program causing a computer to execute a process for attribute estimation. The process includes: extracting, for each user, feature quantities of plural pieces of image information that are associated with attributes of the user; integrating the extracted feature quantities for each user; and performing learning, input of the learning being an integrated feature quantity that has been obtained as a result of integration for each user, output of the learning being one attribute, and generating a learning model.

BRIEF DESCRIPTION OF THE DRAWINGS

Exemplary embodiments of the present invention will be described in detail based on the following figures, wherein:

FIGS. 7A and 7B are schematic diagrams for describing a method of creating image label information in learning operations performed by the information processing apparatus;

FIG. 8 is a schematic diagram illustrating a configuration of image label information;

FIG. 9 is a schematic diagram for describing attribute estimation operations performed by the information processing apparatus;

FIG. 11 is a flowchart illustrating an example of attribute estimation operations performed by the information processing apparatus.

DETAILED DESCRIPTION

First Exemplary Embodiment

Configuration of Information Processing Apparatus

Figure 1:
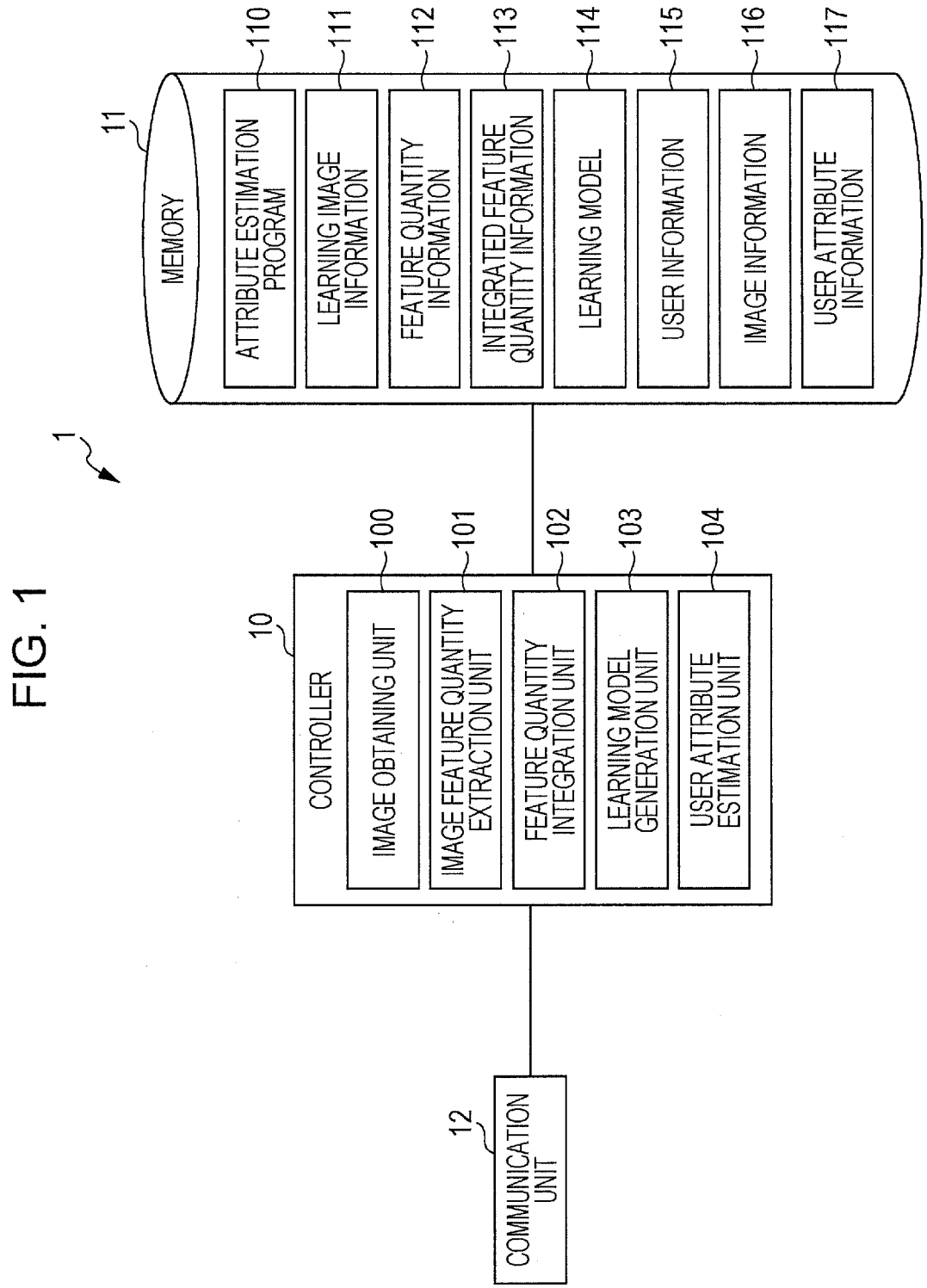
FIG. 1 is a block diagram illustrating an example of a configuration of an information processing apparatus according to a first exemplary embodiment.

FIG. 1 is a block diagram illustrating an example of a configuration of an information processing apparatus according to a first exemplary embodiment.

An information processing apparatus 1 is constituted by a central processing unit (CPU) and the like, and includes a controller 10 that controls each unit and that executes various programs, a memory 11 that is constituted by a storage medium, such as a flash memory, and that stores information, and a communication unit 12 that performs external communication over a network.

The controller 10 executes an attribute estimation program 110 described below to thereby function as an image obtaining unit 100, an image feature quantity extraction unit 101, a feature quantity integration unit 102, a learning model generation unit 103, a user attribute estimation unit 104, and the like.

The image obtaining unit 100 obtains learning image information 111 from the memory 11 in a learning stage. The learning image information 111 is image information that has been posted on a social networking service (SNS), and is image information for learning to which attributes of a user typically including sex, age, occupation, and the like have been assigned in advance as verified ones. In addition to information stored in the memory 11, the learning image information 111 may be information that has been obtained from outside or that has been transmitted and received from outside via the communication unit 12, or may be information prepared by manually assigning attributes to image information to which attributes have not been assigned in advance.

Furthermore, the image obtaining unit 100 obtains image information 116 from the memory 11 in an attribute estimation stage. It is assumed that the image information 116 is image information posted on an SNS, but attributes of a user who has posted the image information have not been assigned and are unknown. The image obtaining unit 100 not only obtains the image information 116 from the memory 11, but may also receive image information obtained from outside or transmitted from outside via the communication unit 12.

The image feature quantity extraction unit 101 extracts feature quantities from the learning image information 111 or the image information 116 obtained by the image obtaining unit 100. The image feature quantity extraction unit 101 stores the feature quantities in the memory 11 as feature quantity information 112. For example, the image feature quantity extraction unit 101 first extracts a local feature quantity using scale-invariant feature transform (SIFT) when extracting a feature quantity, performs clustering on the extracted local feature quantity using k-means, and takes K cluster centers that have been obtained as codewords. Next, the image feature quantity extraction unit 101 generates a bag-of-features (BoF) histogram for a neighbor codeword using a k-nearest neighbor algorithm and spatial pyramid matching (SPM), and assumes the histogram to be a feature quantity.

The feature quantity integration unit 102 integrates the feature quantities extracted by the image feature quantity extraction unit 101 for each user, and generates integrated feature quantity information 113. The feature quantity integration unit 102 adds up, for each user, BoF histograms that are feature quantities, for example, and obtains the integrated feature quantity information 113 by performing normalization using the number of feature quantities.

The learning model generation unit 103 performs learning, the input of the learning being the integrated feature quantity information 113 that has been generated by the feature quantity integration unit 102 integrating, for each user, the feature quantities extracted from the learning image information 111, the output of the learning being attributes of the user, and generates a learning model 114. The learning model generation unit 103 uses an algorithm, such as a support vector machine (SVM), for example, when performing learning.

The user attribute estimation unit 104 estimates, by using the learning model 114, attribute information from the integrated feature quantity information 113 that has been generated by the feature quantity integration unit 102 integrating, for each user, the feature quantities extracted from the image information 116, and generates user attribute information 117 that is associated with the user.

The memory 11 stores the attribute estimation program 110 that causes the controller 10 to operate as the image obtaining unit 100, the image feature quantity extraction unit 101, the feature quantity integration unit 102, the learning model generation unit 103, and the user attribute estimation unit 104, the learning image information 111, the feature quantity information 112, the integrated feature quantity information 113, the learning model 114, user information 115, the image information 116, the user attribute information 117, and the like.

The user information 115 is information, such as a user identification (ID), for identifying a user who uses an SNS.

Note that the learning image information 111, the user information 115, the image information 116, and the user attribute information 117 may be obtained from an external SNS server via the communication unit 12.

Operations Performed by Information Processing Apparatus

Next, actions in the first exemplary embodiment will be described for (1) learning operations and (2) attribute estimation operations separately.

(1) Learning Operations

Figure 2A:
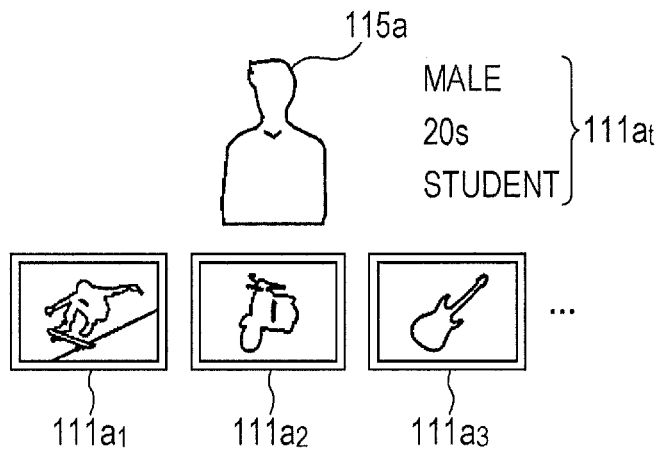
FIGS. 2A to 2C are schematic diagrams for describing learning operations performed by the information processing apparatus.
Figure 2B:
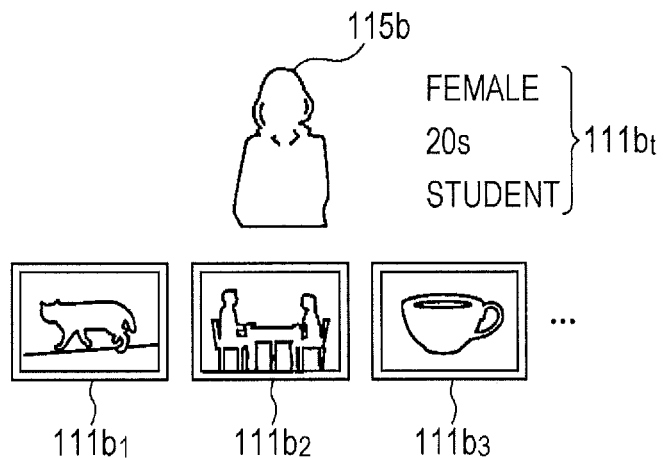
Figure 2C:
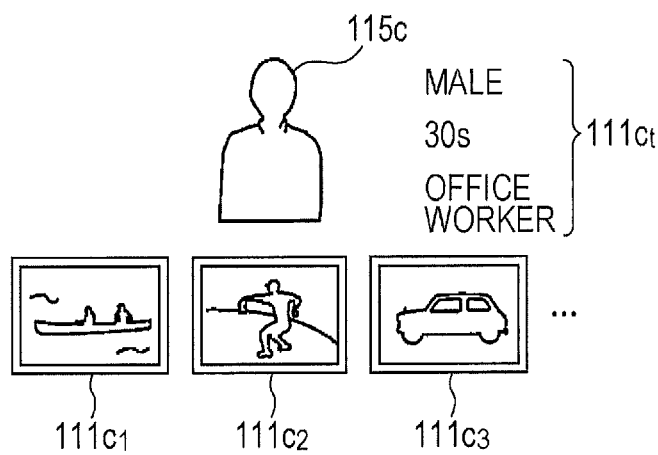
Figure 4:
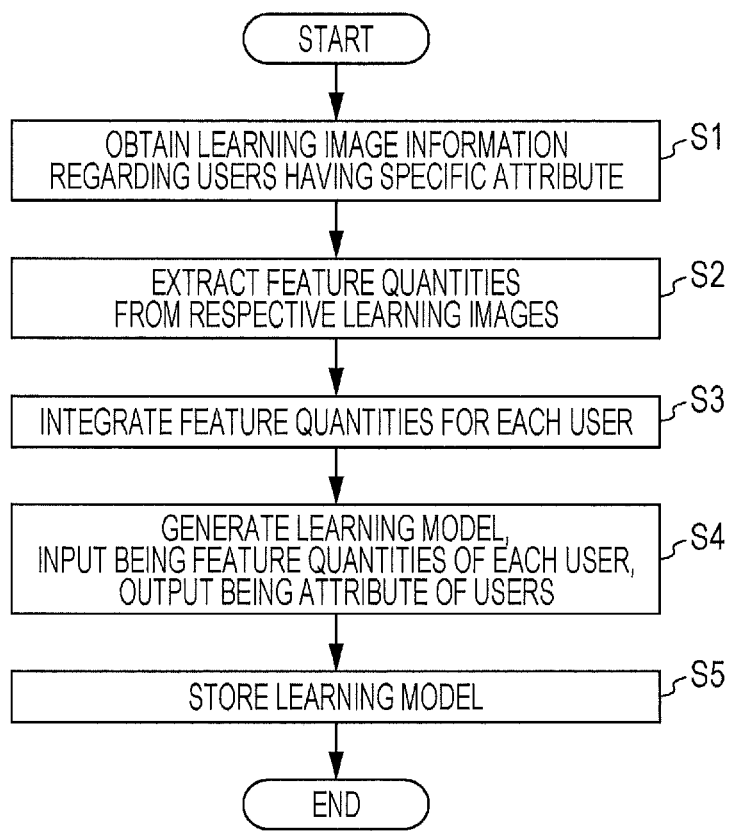
FIG. 4 is a flowchart illustrating an example of learning operations performed by the information processing apparatus.

FIG. 4 is a flowchart illustrating an example of learning operations performed by the information processing apparatus 1. FIGS. 2A to 2C are schematic diagrams for describing learning operations performed by the information processing apparatus 1.

First, the image obtaining unit 100 obtains from the memory 11 the learning image information 111 regarding users who have a specific attribute (step S1).

For example, in examples illustrated in FIGS. 2A to 2C, pieces of image information $111a_1$, $111a_2$, $111a_3$, and so on are image information posted by a user $115a$, pieces of image information $111b_1$, $111b_2$, $111b_3$, and so on are image information posted by a user $115b$, and pieces of image information $111c_1$, $111c_2$, $111c_3$, and so on are image information posted by a user $115c$, and the users $115a$ to $115c$ have been assigned in advance respective attributes $111a_t$ to $111c_t$.

A set of the attributes $111a_t$ and the pieces of image information $111a_1$, $111a_2$, $111a_3$, and so on, a set of the attributes $111b_t$ and the pieces of image information $111b_1$, $111b_2$, $111b_3$, and so on, and a set of the attributes $111c_t$ and the pieces of image information $111c_1$, $111c_2$, $111c_3$, and so on described above are the learning image information 111. If "male" has been selected as a specific attribute, for example, the image obtaining unit 100 obtains the pieces of image information $111a_1$, $111a_2$, $111a_3$, and so on regarding the user $115a$ and the pieces of image information $111c_1$, $111c_2$, $111c_3$, and so on regarding the user $115c$. Note that a specific attribute may be selected by an administrator of the information processing apparatus 1, or the information processing apparatus 1 may select "male", "female", and so on in order.

The image obtaining unit 100 may obtain image information regarding a user to which attributes have not been assigned in advance, the attributes being assigned by the user or an administrator of the information processing apparatus 1 thereafter, and may handle the image information and the attributes as the learning image information 111.

Next, the image feature quantity extraction unit 101 extracts feature quantities respectively from the pieces of image information $111a_1$, $111a_2$, $111a_3$, and so on and the pieces of image information $111c_1$, $111c_2$, $111c_3$, and so on that have been obtained by the image obtaining unit 100 (step S2). The image feature quantity extraction unit 101 stores the feature quantities in the memory 11 as the feature quantity information 112.

Next, the feature quantity integration unit 102 integrates the feature quantities extracted by the image feature quantity extraction unit 101 for each user, and generates the integrated feature quantity information 113 (step S3). That is, the feature quantities extracted from the pieces of image information $111a_1$, $111a_2$, $111a_3$, and so on are integrated and assumed to be integrated feature quantity information $113a$ regarding the user $115a$, and the feature quantities extracted from the pieces of image information $111c_1$, $111c_2$, $111c_3$, and so on are integrated and assumed to be integrated feature quantity information $113c$ regarding the user $115c$.

Next, the learning model generation unit 103 performs learning, the input of the learning being the integrated feature quantity information $113a$ and $113c$, the output of the learning being an attribute of the users, that is, "male", generates the learning model 114 (step S4), and stores the learning model 114 in the memory 11 (step S5).

Next, attribute estimation operations using the above-described learning model 114 will be described.

(2) Attribute Estimation Operations

Figure 3:
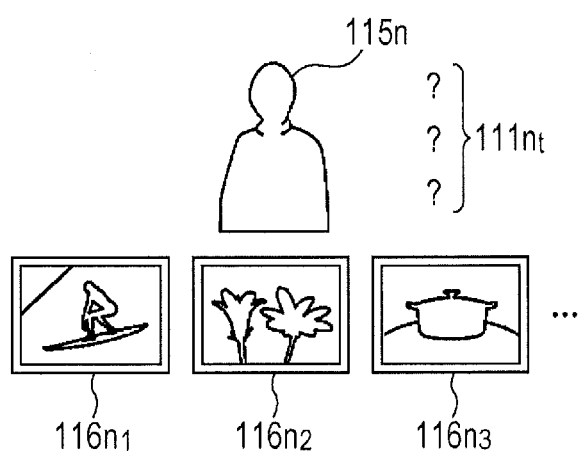
FIG. 3 is a schematic diagram for describing attribute estimation operations performed by the information processing apparatus.
Figure 5:
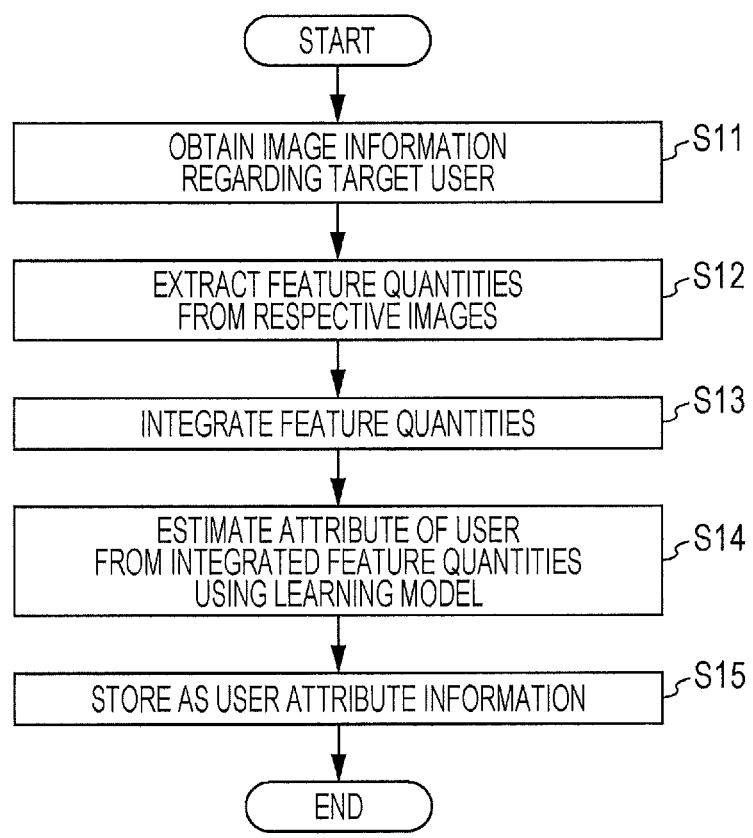
FIG. 5 is a flowchart illustrating an example of attribute estimation operations performed by the information processing apparatus.

FIG. 5 is a flowchart illustrating an example of attribute estimation operations performed by the information processing apparatus 1. FIG. 3 is a schematic diagram for describing attribute estimation operations performed by the information processing apparatus 1.

First, the image obtaining unit 100 refers to the user information 115, as illustrated in FIG. 3, determines a user $115n$ to be a user who is to be a target of attribute estimation, and obtains pieces of image information $116n_1$, $116n_2$, $116n_3$, and so on that have been posted by the user $115n$, from the memory 11 (step S11). It is assumed that attributes $111n_t$ of the user $115n$ are unknown. The image obtaining unit 100 may receive plural pieces of image information transmitted from a user for which attribute estimation is desired, and may assume the user to be a target of attribute estimation. That is, the image obtaining unit 100 need not refer to the user information 115.

Next, the image feature quantity extraction unit 101 extracts feature quantities respectively from the pieces of image information $116n_1$, $116n_2$, $116n_3$, and so on that have been obtained by the image obtaining unit 100 (step S12).

Next, the feature quantity integration unit 102 integrates the feature quantities extracted by the image feature quantity extraction unit 101, and generates the integrated feature quantity information 113 (step S13). That is, the feature quantities extracted from the pieces of image information 116$n_1$, 116$n_2$, 116$n_3$, and so on are integrated and assumed to be integrated feature quantity information 113$n$ regarding the user 115$n$.

Next, the user attribute estimation unit 104 estimates attribute information 117$n$ from the integrated feature quantity information 113$n$, by using the learning model 114 generated as described in "(1) Learning Operations" (step S14), and, if an attribute "male" is obtained, stores the attribute in the memory 11 as the user attribute information 117 while associating the attribute with the user 115$n$ (step S15).

Second Exemplary Embodiment

A second exemplary embodiment is different from the first exemplary embodiment in that learning is performed by taking into consideration not only user attributes but also labels assigned to image information, and an attribute of a user who has posted image information is estimated on the basis of the result of the learning.

Figure 6:
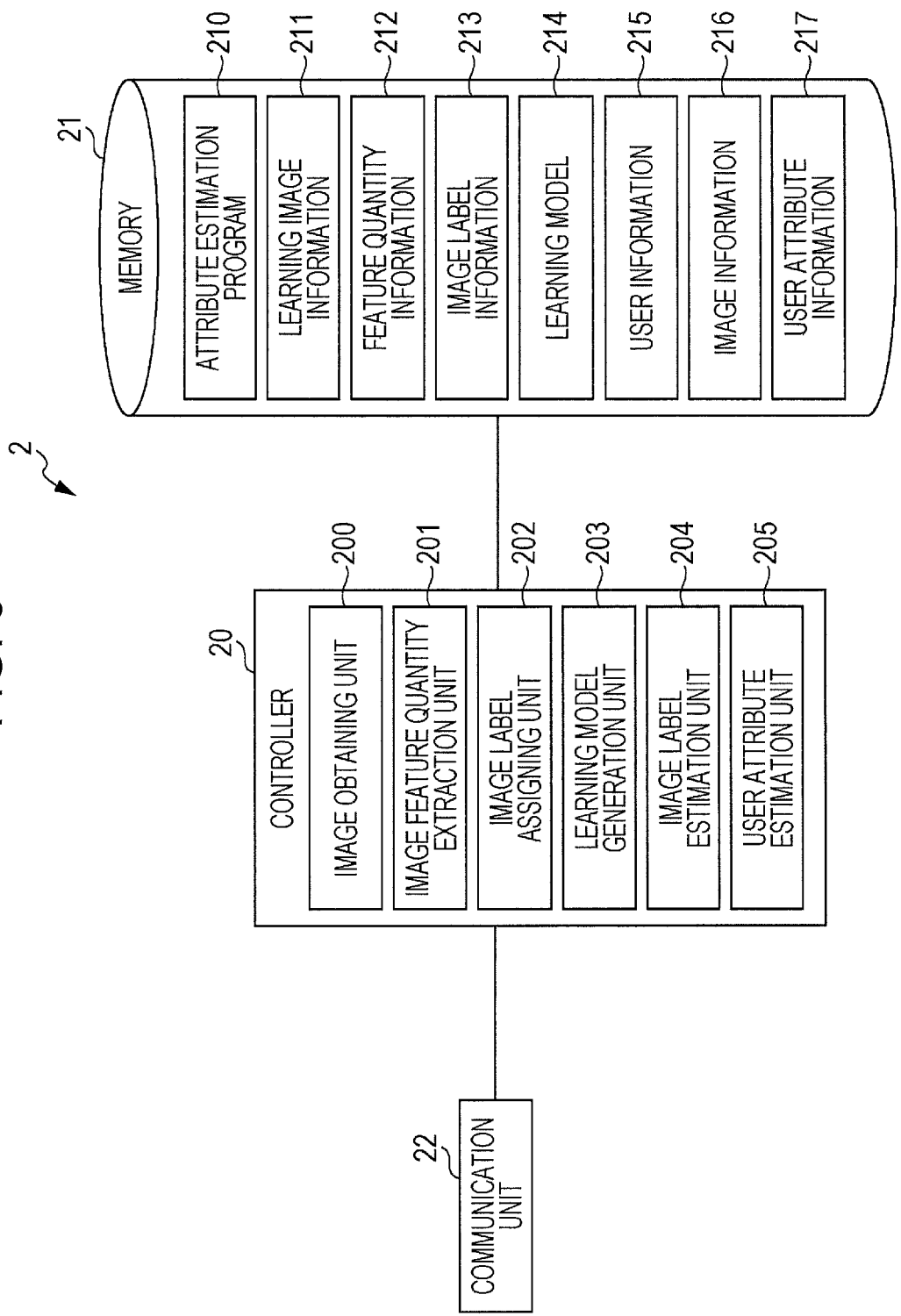
FIG. 6 is a block diagram illustrating an example of a configuration of an information processing apparatus according to a second exemplary embodiment.

FIG. 6 is a block diagram illustrating an example of a configuration of an information processing apparatus according to the second exemplary embodiment.

An information processing apparatus 2 is constituted by a CPU and the like, and includes a controller 20 that controls each unit and that executes various programs, a memory 21 that is constituted by a storage medium, such as a flash memory, and that stores information, and a communication unit 22 that performs external communication over a network.

The controller 20 executes an attribute estimation program 210 described below to thereby function as an image obtaining unit 200, an image feature quantity extraction unit 201, an image label assigning unit 202, a learning model generation unit 203, an image label estimation unit 204, a user attribute estimation unit 205, and the like.

The image obtaining unit 200 has functions similar to the image obtaining unit 100 in the first exemplary embodiment. The image feature quantity extraction unit 201 has functions similar to the image feature quantity extraction unit 101 in the first exemplary embodiment. The image feature quantity extraction unit 201 stores feature quantities that have been extracted in the memory 21 as feature quantity information 212.

The image label assigning unit 202 assigns image label information 213 that is generated by combining user attributes and image contents in accordance with the contents of learning image information 211.

The learning model generation unit 203 performs learning, the input of the learning being feature quantities that have been extracted by the image feature quantity extraction unit 201 from the learning image information 211, the output of the learning being image labels assigned to the learning image information 211, and generates a learning model 214.

The image label estimation unit 204 calculates, by using the learning model 214, scores of the image labels from feature quantities that have been extracted by the image feature quantity extraction unit 201 from image information 216, and estimates image labels to be associated with the image information 216 on the basis of the scores.

The user attribute estimation unit 205 integrates the image labels that have been estimated by the image label estimation unit 204 for each user, estimates an attribute of the user by comparing the scores of respective attributes, and generates user attribute information 217 that is associated with the user.

The memory 21 stores the attribute estimation program 210 that causes the controller 20 to operate as the image obtaining unit 200, the image feature quantity extraction unit 201, the image label assigning unit 202, the learning model generation unit 203, the image label estimation unit 204, and the user attribute estimation unit 205, the learning image information 211, the feature quantity information 212, the image label information 213, the learning model 214, user information 215, the image information 216, the user attribute information 217, and the like.

Operations Performed by Information Processing Apparatus

Next, actions in the second exemplary embodiment will be described for (1) learning operations and (2) attribute estimation operations separately.

(1) Learning Operations

Figure 10:
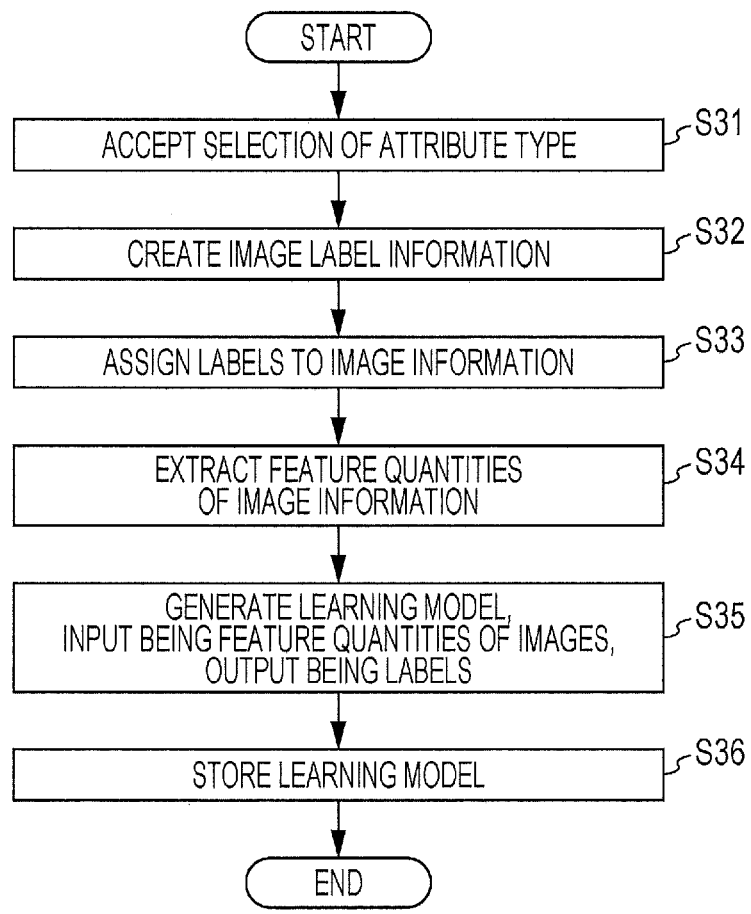
FIG. 10 is a flowchart illustrating an example of learning operations performed by the information processing apparatus.

FIG. 10 is a flowchart illustrating an example of learning operations performed by the information processing apparatus 2. FIGS. 7A and 7B are schematic diagrams for describing a method of creating the image label information 213 in learning operations performed by the information processing apparatus 2. FIG. 8 is a schematic diagram illustrating a configuration of the image label information 213.

First, the image label assigning unit 202 accepts selection of an attribute type for which learning (estimation) is desired (step S31). Description will be given below while assuming that, as illustrated in FIG. 7A, there are attribute types including an attribute type 217$a$ that indicates "sex", an attribute type 217$b$ that indicates "age", and so on, and that the attribute type 217$a$ that indicates "sex" has been selected by an administrator or the like.

Next, the image label assigning unit 202 combines the attribute type 217$a$ that has been selected and image contents 213$a$ illustrated in FIG. 7B, and creates the image label information 213 illustrated in FIG. 8 (step S32). The image label information 213 is obtained by combining attributes included in the attribute type 217$a$ and the image contents 213$a$, and therefore, 30 image labels are created, the number "30" being obtained by multiplying the number of attributes "3" by the number of labels "10".

Next, the image label assigning unit 202 assigns the created image labels of the image label information 213 to the learning image information 211 in accordance with operations performed by an administrator or the like (step S33). Note that the learning image information 211 to which image labels have been assigned in advance may be prepared. Furthermore, a configuration may be employed in which feature quantities of the learning image information 211 are extracted, clustering is performed on the learning image information 211 on the basis of the feature quantities, the image label information 213 is created by using names, such as "class 1", "class 2", "class 3", and so on, that are based on the clustering classification, instead of using the image contents 213$a$, and the image labels are automatically assigned.

Next, the image feature quantity extraction unit 201 extracts feature quantities from the learning image information 211 (step S34). The image feature quantity extraction unit 201 stores the feature quantities in the memory 21 as the feature quantity information 212.

Next, the learning model generation unit 203 performs learning, the input of the learning being the feature quantities that have been extracted by the image feature quantity extraction unit 201 from the learning image information 211, the output of the learning being image labels assigned to the learning image information 211, generates the learning model 214 (step S35), and stores the learning model 214 in the memory 21 (step S36).

(2) Attribute Estimation Operations

FIG. 11 is a flowchart illustrating an example of attribute estimation operations performed by the information processing apparatus 2. FIG. 9 is a schematic diagram for describing attribute estimation operations performed by the information processing apparatus 2.

First, the image obtaining unit 200 refers to the user information 215, determines a user who is to be a target of attribute estimation, and obtains pieces of image information posted by the user, from the memory 21 (step S41). It is assumed that attributes of the user are unknown.

Next, the image feature quantity extraction unit 201 extracts feature quantities from the pieces of image information obtained by the image obtaining unit 200 (step S42). The image feature quantity extraction unit 201 stores the feature quantities in the memory 21 as the feature quantity information 212.

Next, the image label estimation unit 204 calculates, by using the learning model 214 generated as described in "(1) Learning Operations", scores that are estimation values, each indicating the degree of matching with a corresponding image label, as illustrated in FIG. 9, from the feature quantities that have been extracted by the image feature quantity extraction unit 201 from the image information 216, and obtains score calculation results 204a (step S43). In an example illustrated in FIG. 9, the score calculation results 204a are results of calculation of the scores of all image labels, and items in the score calculation results 204a are sorted in descending order of score.

Next, the user attribute estimation unit 205 integrates the scores of image labels for each attribute on the basis of the score calculation results 204a (step S44). For example, the scores of image labels that include "female" are added up, and the score of the attribute "female" is obtained. The scores of image labels that include "male" are added up, and the score of the attribute "male" is obtained. Similarly, the scores of image labels that include "unknown" are added up, and the score of the attribute "unknown" is obtained. Note that a method of integrating scores is not limited to a method using addition, and may be a method in which the highest score is selected for each attribute or may be based on other calculation methods.

Next, in a case where the score of the attribute "female", which is 3.56, the score of the attribute "male", which is 2.11, and the score of the attribute "unknown", which is 0.22, are obtained, for example, the user attribute estimation unit 205 compares these values, estimates that the attribute "female" that has the highest score is an attribute of the user (step S45), and stores the attribute in the memory 21 as the user attribute information 217 while associating the attribute with the user (step S46).

In a case where an attribute is not alternatively determined but may have plural values, the user attribute estimation unit 205 estimates each attribute, an integrated value of which exceeds a predetermined threshold, to be an attribute of the user.

Other Exemplary Embodiments

Note that the present invention is not limited to the exemplary embodiments described above, and various modifications may be made without departing from the spirit of the present invention. In the first exemplary embodiment, while the functions of the image obtaining unit 100, the image feature quantity extraction unit 101, the feature quantity integration unit 102, the learning model generation unit 103, and the user attribute estimation unit 104 of the controller 10 are implemented only by the information processing apparatus 1, some of the functions may be implemented by other server apparatuses or terminal apparatuses. Similarly, in the second exemplary embodiment, some of the functions of the image obtaining unit 200, the image feature quantity extraction unit 201, the image label assigning unit 202, the learning model generation unit 203, the image label estimation unit 204, and the user attribute estimation unit 205 of the controller 20 may be implemented by other server apparatuses or terminal apparatuses.

The learning image information 111, the feature quantity information 112, the integrated feature quantity information 113, the learning model 114, the user information 115, the image information 116, and the user attribute information 117 need not be stored in the memory 11 of the information processing apparatus 1, and the learning image information 211, the feature quantity information 212, the image label information 213, the learning model 214, the user information 215, the image information 216, and the user attribute information 217 need not be stored in the memory 21 of the information processing apparatus 2. These pieces of information may be obtained from an external database or an external apparatus, or may be transmitted and received from an external apparatus without being stored in the memory 11 or the memory 21, and may be used by each unit.

In the exemplary embodiments described above, while the functions of the image obtaining unit 100, the image feature quantity extraction unit 101, the feature quantity integration unit 102, the learning model generation unit 103, and the user attribute estimation unit 104 of the controller 10, and the functions of the image obtaining unit 200, the image feature quantity extraction unit 201, the image label assigning unit 202, the learning model generation unit 203, the image label estimation unit 204, and the user attribute estimation unit 205 of the controller 20 are implemented by the programs, all or some of the units may be implemented by hardware, such as an application-specific integrated circuit (ASIC). The programs used in the above-described exemplary embodiments may be stored in a recording medium, such as a compact disc read-only memory (CD-ROM), and provided. Furthermore, the steps described in the above exemplary embodiments may be interchanged, deleted, or added, for example, without changing the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for attribute estimation, the process comprising:

extracting, for each user, feature quantities of a plurality of image information that are associated with attributes of the user, the user being a user that posted image information, wherein the posted image information are icons relating to interests of the user;

integrating the extracted feature quantities for each user; and performing learning, input of the learning being an integrated feature quantity that has been obtained as a result of integration for each user, output of the learning being one attribute of the user that posted the image information, and generating a learning model, wherein each of the plurality of image information are scored and the attribute of the user is estimated based upon whether or not the score of the plurality of image information reaches a threshold.

2. A non-transitory computer readable medium storing a program causing a computer to execute a process for attribute estimation, the process comprising:

extracting, for attribute estimation, feature quantities of a plurality of image information that are associated with a user, the user being a user that posted image information, wherein the posted image information are icons relating to interests of the user;

integrating the feature quantities that have been extracted for attribute estimation; and estimating an attribute of the user that posted the image information from an integrated feature quantity that has been obtained as a result of integration of the feature quantities extracted for attribute estimation, by using a learning model, wherein each of the plurality of image information are scored and the attribute of the user is estimated based upon whether or not the score of the plurality of image information reaches a threshold.

3. A non-transitory computer readable medium storing a program causing a computer to execute a process for attribute estimation, the process comprising:

extracting feature quantities of a plurality of image information that are associated with combinations of user attributes and image contents, the user attributes and image contents being of a user that posted image information, wherein the posted image information are icons relating to interests of the user; and performing learning, input of the learning being the extracted feature quantities, output of the learning being combinations of one user attribute and the image contents, the user attribute and image contents being of the user that posted the image information, and generating a learning model, wherein each of the plurality of image information are scored and the user attribute is estimated based upon whether or not the score of the plurality of image information reaches a threshold.

4. A non-transitory computer readable medium storing a program causing a computer to execute a process for attribute estimation, the process comprising:

extracting, for attribute estimation, feature quantities of a plurality of image information that are associated with a user, the user being a user that posted image information, wherein the posted image information are icons relating to interests of the user;

estimating, from the feature quantities extracted for attribute estimation, matching degrees of combinations of user attributes and image contents by using a learning model, as estimation values; and calculating estimation values of respective attributes by integrating, for each of the attributes, the estimation values that indicate the matching degrees of the combinations of the user attributes and the image contents, and estimating an attribute of the user that posted the image information in accordance with the estimation values of the respective attributes, wherein each of the plurality of image information are scored and the attribute of the user is estimated based upon whether or not the score of the plurality of image information reaches a threshold.

5. An information processing apparatus comprising:

at least one processor configured to execute:

an extraction unit that extracts, for each user, feature quantities of a plurality of image information that are associated with attributes of the user, the user being a user that posted image information, wherein the posted image information are icons relating to interests of the user;

a feature quantity integration unit that integrates the feature quantities extracted by the extraction unit for each user; and a learning unit that performs learning, input of the learning being an integrated feature quantity that has been obtained as a result of integration performed by the feature quantity integration unit for each user, output of the learning being one attribute of the user that posted the image information, and generates a learning model, wherein each of the plurality of image information are scored and the attribute of the user is estimated based upon whether or not, the score of the plurality of image information reaches a threshold.

6. An information processing apparatus comprising:

at least one processor configured to execute:

an extraction unit that extracts, for attribute estimation, feature quantities of a plurality of image information that are associated with a user, the user being a user that posted image information wherein the posted image information are icons relating to interests of the user;

a feature quantity integration unit that integrates the feature quantities that have been extracted for attribute estimation; and an attribute estimation unit that estimates an attribute of the user that posted the image information from an integrated feature quantity that has been obtained as a result of integration of the feature quantities extracted for attribute estimation, the integration having been performed by the feature quantity integration unit, by using a learning model, wherein each of the plurality of image information are scored and the attribute of the user is further estimated based upon whether or not the score of the plurality of image information reaches a threshold.

7. An information processing apparatus comprising:

at least one processor configured to execute:

an extraction unit that extracts feature quantities of a plurality of image information that are associated with combinations of user attributes and image contents, the user attributes and image contents being of a user that posted image information, wherein the posted image information are icons relating to interests of the user; and a learning unit that performs learning, input of the learning being the feature quantities extracted by the extraction unit, output of the learning being combinations of one user attribute and the image contents, the user attribute and image contents being of the user that posted the image information, and generates a learning model, wherein each of the plurality of image information are scored and user attribute is estimated based upon whether or not the score of the plurality of image information reaches a threshold.

8. An information processing apparatus comprising:

at least one processor configured to execute:

an extraction unit that extracts, for attribute estimation, feature quantities of a plurality of image information that are associated with a user, the user being a user that posted image information, wherein the posted image information are icons relating to interests of the user;

a label estimation unit that estimates, from the feature quantities extracted for attribute estimation, matching degrees of combinations of user attributes and image contents by using a learning model, as estimation values; and an attribute estimation unit that calculates estimation values of respective attributes by integrating, for each of the attributes, the estimation values that indicate the matching degrees of the combinations of the user attributes and the image contents, and estimates an attribute of the user that posted the image information in accordance with the estimation values of the respective attributes, wherein each of the plurality of image information are scored and the attribute of the user is further estimated based upon whether or not the score of the plurality of image information reaches a threshold.

9. An attribute estimation method comprising:

extracting, for each user, feature quantities of a plurality of image information that are associated with attributes of the user, the user being a user that posted image information, wherein the posted image information are icons relating to interests of the user;

integrating the extracted feature quantities for each user; and performing learning, input of the learning being an integrated feature quantity that has been obtained as a result of integration for each user, output of the learning being one attribute of the user that posted the image information, and generating a learning model, wherein each of the plurality of image information are scored and the one attribute of the user is estimated based upon whether or not the score of the plurality of image information reaches a threshold.

* * * * *